US009065501B2

(12) United States Patent
Fodor et al.

(10) Patent No.: US 9,065,501 B2
(45) Date of Patent: Jun. 23, 2015

(54) METHOD AND ARRANGEMENT IN A WIRELESS COMMUNICATION SYSTEM

(75) Inventors: Gabor Fodor, Hässelby (SE); Jessica Östergaard, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 220 days.

(21) Appl. No.: 13/011,905

(22) Filed: Jan. 23, 2011

(65) Prior Publication Data

US 2011/0182256 A1 Jul. 28, 2011

Related U.S. Application Data

(63) Continuation of application No. PCT/SE2010/050078, filed on Jan. 27, 2010.

(51) Int. Cl.
*H04W 4/00* (2009.01)
*H04B 7/04* (2006.01)
*H04B 7/02* (2006.01)
*H04W 72/04* (2009.01)
*H04W 92/20* (2009.01)

(52) U.S. Cl.
CPC .............. *H04B 7/0452* (2013.01); *H04B 7/024* (2013.01); *H04W 72/0426* (2013.01); *H04W 92/20* (2013.01)

(58) Field of Classification Search
CPC ............................ H04B 7/0697; H04B 7/0452
USPC .......................................................... 370/329
See application file for complete search history.

(56) References Cited

U.S. PATENT DOCUMENTS

| 2007/0058595 | A1* | 3/2007 | Classon et al. ................ 370/337 |
| 2007/0115867 | A1 | 5/2007 | Fujishima et al. |
| 2008/0009256 | A1* | 1/2008 | Anderson ...................... 455/296 |
| 2008/0125154 | A1* | 5/2008 | Zirwas et al. ................. 455/501 |
| 2008/0298250 | A1* | 12/2008 | Larsson ........................ 370/238 |
| 2009/0036150 | A1* | 2/2009 | Liao et al. ..................... 455/501 |

(Continued)

FOREIGN PATENT DOCUMENTS

EP 1699200 A2 9/2006

OTHER PUBLICATIONS

3GPP, Way forward on UL ICIC/Overload Indicator for LTE, Nov. 5-9, 2007, 3GPP TSG RAN WG1 # 51 R1-075050, pp. 12.*

(Continued)

*Primary Examiner* — Brandon Renner
*Assistant Examiner* — Faisal Choudhury
(74) *Attorney, Agent, or Firm* — Patent Portfolio Builders PLLC

(57) ABSTRACT

The present invention relates to a method for enabling intercell interference coordination in a network node 112, 132, which is comprised in a wireless communications network 100. The network node 112, 132 comprises at least two antennas for multi-antenna transmission and/or reception. According to the method, the network node 112, 132 transmits an indication of an amount of spatially multiplexed streams for at least one block of radio resources to at least one receiving network node 122, which is also comprised in the wireless communications network 100. By indicating the amount of spatially multiplexed streams, it is made possible for the receiving network node 122 to take the intercell interference in the spatial domain into consideration, for instance in a scheduling and/or link adaptation decision.

31 Claims, 8 Drawing Sheets

(56) References Cited

U.S. PATENT DOCUMENTS

| | | | |
|---|---|---|---|
| 2009/0215480 A1* | 8/2009 | Kim et al. | 455/501 |
| 2009/0225722 A1* | 9/2009 | Cudak et al. | 370/330 |
| 2009/0279486 A1* | 11/2009 | Kishigami et al. | 370/329 |
| 2010/0091678 A1* | 4/2010 | Chen et al. | 370/252 |
| 2010/0151875 A1* | 6/2010 | Kim et al. | 455/452.2 |
| 2010/0234061 A1* | 9/2010 | Khandekar et al. | 455/522 |
| 2011/0044247 A1* | 2/2011 | Luo et al. | 370/328 |
| 2011/0053598 A1* | 3/2011 | Ahluwalia | 455/436 |

OTHER PUBLICATIONS

EPO, Int'l Search Report in PCT/SE2010/050078, Jan. 25, 2011.
EPO, International Preliminary Report on Patentability in PCT/SE2010/050078, Aug. 9, 2012.

* cited by examiner

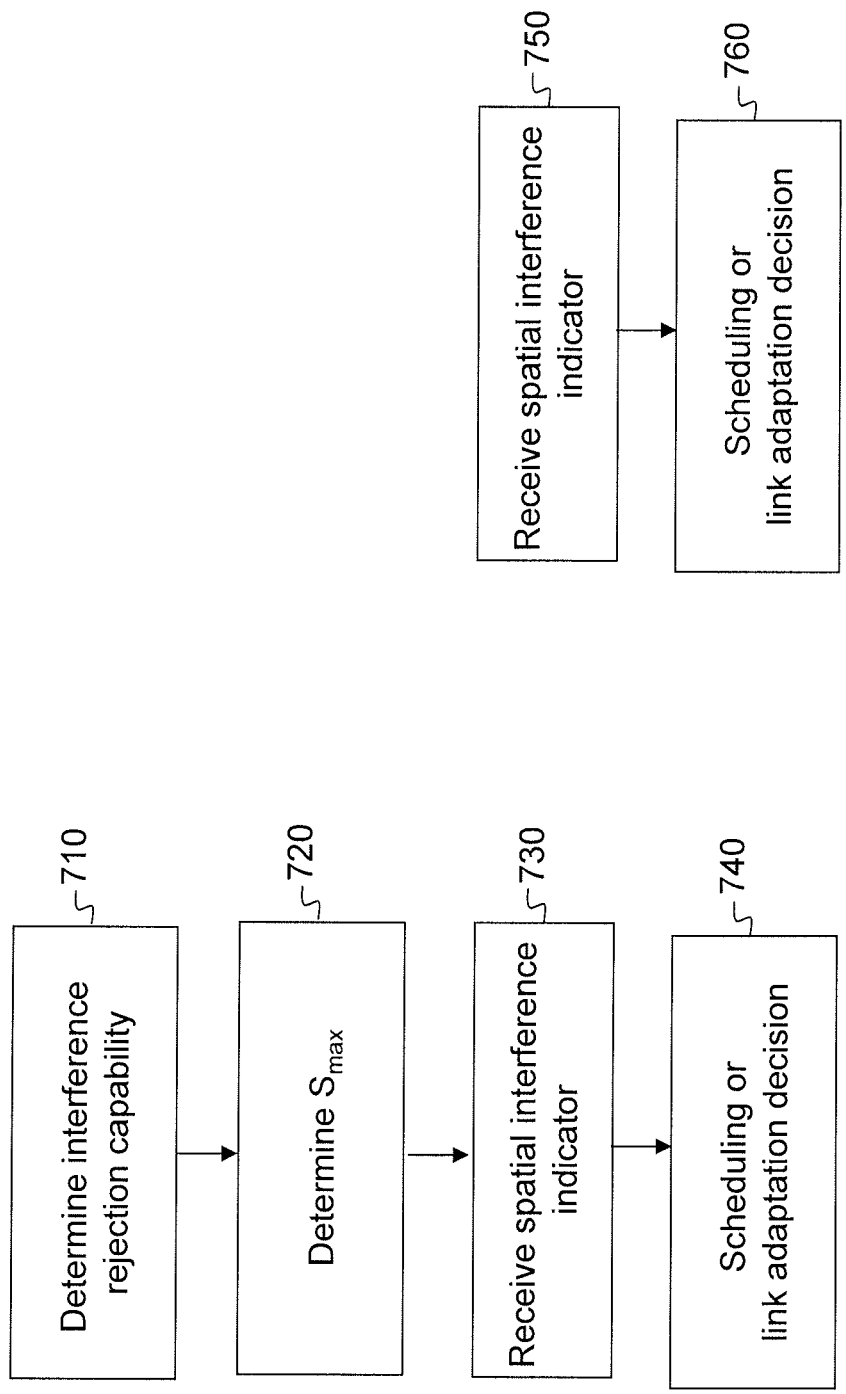

METHOD AND ARRANGEMENT IN A WIRELESS COMMUNICATION SYSTEM

TECHNICAL FIELD

The present invention relates generally to methods and arrangements in a network node for enabling intercell interference coordination, and to methods and arrangements for scheduling and/or link adaptation in a network node.

BACKGROUND

The performance of wireless communications systems may be significantly improved by using multi-antenna techniques. Such techniques rely on the use of multiple antennas at the receiver and/or the transmitter, in combination with signal processing. Performance improvement is made possible because the antennas are spaced a certain distance apart from each other. The relation between the antenna distance and the mutual correlation between the radio-channel fading experienced by the signals at the different antennas can then be exploited in different ways depending on the antenna configuration, for instance to achieve transmit diversity, beam-forming or spatial multiplexing.

Transmit diversity is when an identical signal, or data stream, is being transmitted from multiple antennas. Because of the spatial distance between the antennas, the same signal will thus be transmitted over several independent channels with different characteristics. This improves the likelihood that the signal can be correctly decoded at the receiver end, because it is unlikely that all the channels will fade simultaneously.

In spatial multiplexing, a number of different data streams are transmitted on the same bandwidth, i.e. the same radio resources, from multiple transmit antennas. The streams may originate from a single user, in the case where the user equipment (UE) is provided with multiple antennas, or from different users, which are scheduled for transmission on the same radio resources. The data streams are separated again on the receiver side by the receive antennas. Thus, spatial multiplexing requires multiple antennas at both the transmitter and receiver sides. In closed-loop spatial multiplexing, the transmitter also receives feedback from the receiver in the form of channel information. This enables the transmitter to improve signal quality by adapting to the actual channel conditions as experienced by the receiver.

The use of multiple antennas at both transmitter and receiver is generally referred to as Multiple-Input/Multiple-Output (MIMO). MIMO transmission and reception can be used in several ways to improve the data transmission reliability and to increase the spectrum efficiency and the capacity of wireless networks. The 3GPP standard allows taking advantage of MIMO transmission by defining MIMO modes, i.e. a set of different MIMO transmission schemes. The system may switch between different MIMO modes depending on the channel conditions. For instance, the Long-Term Evolution (LTE) standard, also referred to as Evolved Universal Terrestrial Radio Access Network (E-UTRAN), defines seven such MIMO modes, including single antenna port transmission, closed loop spatial multiplexing and multi-user MIMO (MU MIMO) mode.

MU MIMO allows multiple users to spatially share time and frequency resources, such as orthogonal frequency division multiple access (OFDMA) resource blocks. Thus, MU MIMO is a natural extension of single user multi-stream transmissions by allowing the multiple spatial streams to belong to different users.

State of the art MIMO scheduling algorithms are typically concerned with the number of spatial streams multiplexed on such resources, and are directed mainly to single-user MIMO (SU MIMO). In the case of multi-user MIMO, the multiple spatial data streams may belong to different users, and therefore MU MIMO algorithms also deal with the "pairing" of users, that is, determining which users share the same time, frequency and code resources. The pairing is affected by the maximum number of data streams that can be reliably decoded by the receiver at a certain point in time. For example, the number of uplink data streams that can be decoded by a base station under a predefined bit error rate (BER) target depends on the number of receive antennas, the receiver algorithm, the applied transmit power levels, the prevailing channel conditions and several other factors. However, it is noted that in general, the maximum number of spatially multiplexed streams that can be reliably decoded by the receiver, i.e. decodable with sufficiently low bit error rate (BER) for practical purposes is equal to the number of receive antennas. For example, a base station with four antennas will in principle not be able to successfully decode more than four spatially multiplexed streams. For this reason, such a base station should not schedule more than four uplink streams for transmission on the same resource block.

Wireless communications systems are typically cellular, i.e. the geographical area within which coverage is provided is divided into multiple smaller areas, referred to as cells. Each cell is managed by a cell site or radio base station. Such multicell systems generally define some protocol support to coordinate resource management actions, e.g. scheduling, power control, MIMO mode switching (including the switching of the number of spatially multiplexed streams), etc, such that the overall system performance is satisfactory. For instance, transmissions originating from a mobile terminal or a base station in one cell may cause interference to neighboring cells, commonly referred to as intercell or other-cell interference. In some cellular systems, this problem is mitigated by frequency planning, i.e. the frequency spectrum is divided such that neighboring cells use different parts of the spectrum. However, in state of the art OFDM systems, including the 3GPP LTE and the IEEE WiMax standards compliant cellular systems, the entire frequency spectrum is reused in all cells. That is, state of the art OFDM systems are of frequency spectrum reuse 1. Therefore, the problem of intercell interference is particularly significant in these systems.

For this reason, the LTE standard defines messages between base stations that help to coordinate the intercell and intersite interference. Two examples of such messages are the high interference indicator (HII) and the overload indicator (OI), both of which can be used by proprietary intercell interference coordination (ICIC) algorithms that can operate at the OFDM resource block level. These indicators are sent over the X2 interface, which is the interface that base stations use to communicate with each other in LTE.

The HII gives information about interference that a base station intends or expects to cause by transmissions in its own cell, while the OI gives information about what interference a base station receives, i.e. experiences, from interferers. In more detail, the HII indicates, per frequency resource, if the base station sending the HII intends to allocate the frequency resource to a user causing much interference. The OI instead states if the base station sending an OI message is experiencing high, medium or low interference per frequency resource. In LTE, both the HII and the OI work on a frequency granularity of one resource block, but they could in principle work on any, predefined frequency granularity or apply over the entire bandwidth.

The HII and OI indicators can be used proactively, a base station (BS) basically indicating in advance or requesting to/from its neighbors that certain resource blocks will be used. They may also be used reactively, i.e. a BS sends a message when it senses that the interference level is too high on certain resource blocks. Typically, the HII is used as a proactive measure while the OI is reactive.

It should be noted that the standard does not specify how the HII and OI are triggered, i.e. what interference metric should be used, what measurements the base station uses and what level of interference is considered to be high, medium, or low, respectively. Thus, the exact behavior with respect to these indicators is proprietary. However, known methods all use a metric based on a combination of received signal and interference power, e.g. SINR, normalized interference power, or interference over thermal noise (IoT). Thus, the HII and OI basically indicate if a resource block is used or not used and to what interference level.

Recall from the previous sections that in MIMO OFDM systems the same OFDM resource blocks can be used by multiple streams, and multiple users, as long as the receiver algorithm can separate the interfering and useful signals. Furthermore, in a multicell environment, the same OFDM resource can be used by users belonging to different cells, thereby increasing the interference on a given OFDM resource block. State of the art ICIC algorithms and the currently existing HII and OI indicators support efficient interference management in the time-frequency domain.

However, although it is widely recognized that MU MIMO increases intercell interference, state of the art ICIC mechanisms typically operate separately of the MU MIMO mode switching and spatial multiplexing algorithms, i.e. multi-user scheduling (including MU MIMO pairing) algorithms. Alternatively, the multicell MIMO power allocation problem, assuming that a scheduling decision has been taken, is sometimes considered as an optimization task. According to these approaches the task is to maximize the multicell sum throughput subject to per UE or per transmit antenna power constraints.

There is thus a need in the art for an improved mechanism for intercell interference coordination.

SUMMARY

It is therefore an object of the present invention to provide a mechanism for improving intercell interference coordination in a wireless communications system using MIMO.

According to an embodiment of the present invention, the object is achieved by a method in a network node for enabling intercell interference coordination. The network node comprises at least two antennas for multi-antenna transmission and/or reception, and is comprised in a wireless communications network. According to the method, the network node transmits an indication of an amount of spatially multiplexed streams for at least one block of radio resources to at least one receiving network node, which is also comprised in the wireless communications network.

According to another embodiment of the present invention, the object is achieved by a method for scheduling and/or link adaptation in a network node. The network node comprises a number N of antennas for multi-antenna transmission and/or reception, where the number N is at least two. In a first step of the method, the network node receives an indication of an amount of spatially multiplexed streams for at least one block of radio resources from at least one other network node, which is also comprised in the wireless communications network. In a further step, the network node uses the indication in a scheduling decision and/or a link adaptation decision.

According to yet another embodiment of the present invention, the object is achieved by a network node for enabling intercell interference coordination. The network node is adapted for use in a wireless communications network, and comprises at least two antennas for multi-antenna transmission and/or reception. The network node further comprises a transmitting unit and one or more processing circuits. The one or more processing circuits are configured to transmit an indication of an amount of spatially multiplexed streams for at least one block of radio resources to at least one receiving network node, which is also comprised in the wireless communications network. The indication is transmitted via the transmitting unit.

According to another embodiment of the present invention, the object is achieved by a network node for use in a wireless communications network. The network node comprises a number N of antennas for multi-antenna transmission and/or reception, where the number N is at least two. Furthermore, the network node comprises at least one processing circuit, a transmitting unit, and a receiving unit. The processing circuit comprises a scheduling circuit and a link adaptation circuit. The processing circuit is configured to receive an indication of an amount of spatially multiplexed streams for at least one block of radio resources from at least one other network node, which is also comprised in the wireless communications network. The indication is received via the receiving unit. The processing circuit is further configured to use the indication in a scheduling decision in the scheduling circuit, and/or in a link adaptation decision in the link adaptation circuit.

By indicating the amount of spatially multiplexed streams for a certain set of radio resources to other network nodes, the receiving node is able to take the spatial intercell interference into account in a scheduling and/or link adaptation decision. For instance, the receiver may reduce the number of spatial streams that it is scheduling on the set of radio resources concerned. Thus, the spatial interference information provides the receiving node with a more accurate picture of the actual intercell interference situation. Consequently, the available radio resources can be utilized in a more efficient manner, leading to overall improvement of the system performance.

BRIEF DESCRIPTION OF THE DRAWINGS

FIG. 7 is a flow chart illustrating a method according to an embodiment of the present invention.

DETAILED DESCRIPTION

It should be noted that although terminology from 3GPP LTE will be used in the following disclosure to exemplify the invention, this should not be seen as limiting the scope of the invention to the aforementioned system. Any other cellular wireless system where MIMO is used may also benefit from exploiting the ideas covered within this disclosure.

The terms "mobile terminal" and "user equipment" are used interchangeably in the present description. Both these terms are intended to encompass any type of device capable of wireless cellular communication, e.g. an LTE user equipment, a laptop computer, PDA etc.

A drawback of known mechanisms for intercell interference coordination (ICIC), for instance based on the HII and OI indicators, is that they only take the frequency-time domain into account. That is, neighboring radio base stations exchange information which is related to the power level of an interfering signal on a certain resource block, or a set of resource blocks. This information is used to estimate the level of interference caused by neighboring cells in different parts of the frequency spectrum. Once a radio base station has an estimate of the level of intercell interference, this information may be used in a scheduling decision. For instance, the radio base station may schedule transmissions in a part of the spectrum where the intercell interference level is low, or expected to be low, thereby improving the likelihood that the signal will be correctly decoded by the receiver.

However, when MIMO is used, these known mechanisms do not necessarily yield an accurate estimate of the intercell interference level. This is because MIMO transmissions will also cause interference in the spatial domain, which is orthogonal to the time-frequency domain. Considering only the time-frequency domain may therefore result in an estimate of the interference level which is either too low or too high. In either case, the system performance will suffer. This concept will now be described in more detail with reference to FIG. 1.

Figure 1:
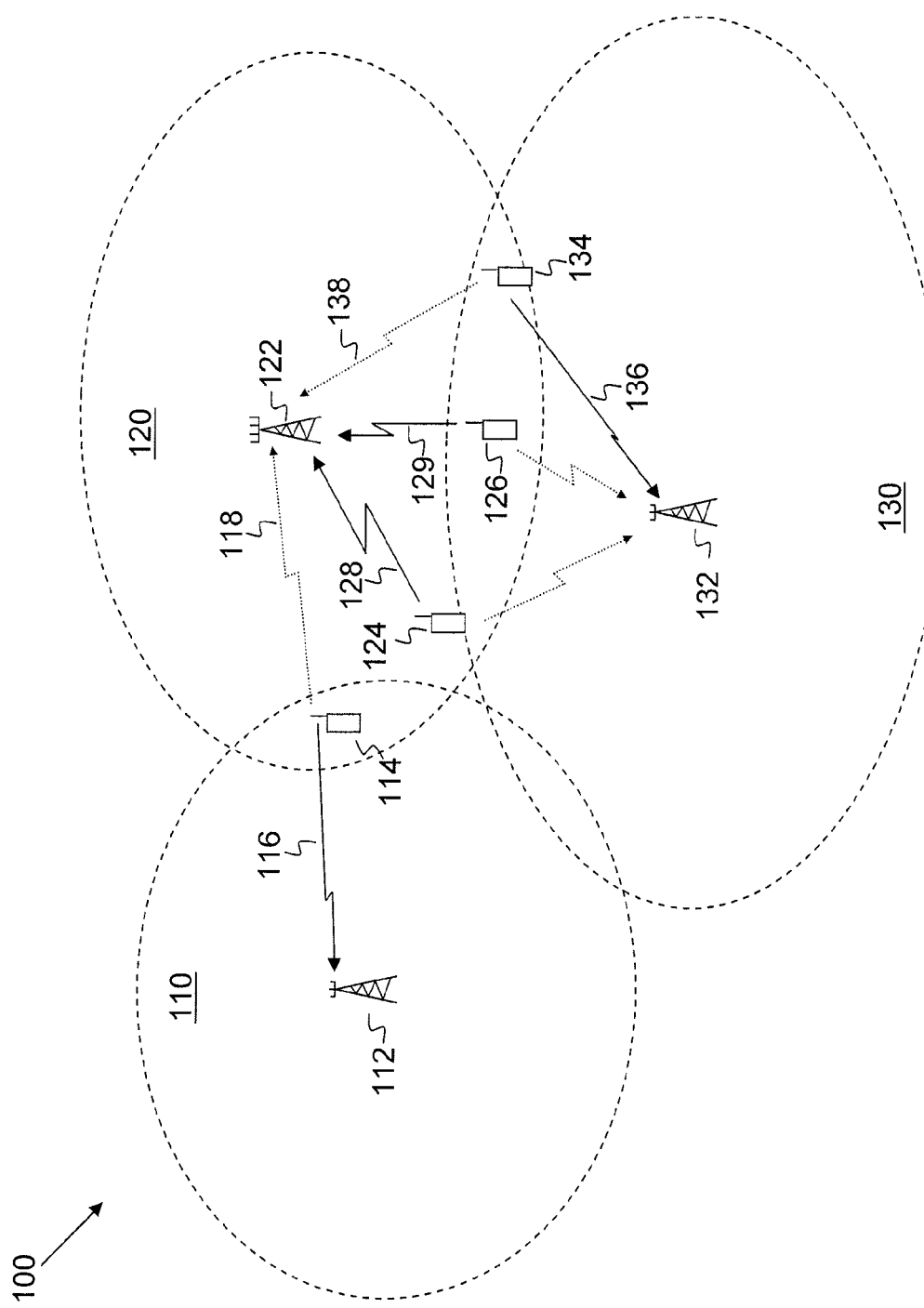
FIG. 1 is a schematic diagram illustrating an uplink transmission scenario in a radio access network.

FIG. 1 is a schematic diagram showing an exemplary wireless communications network 100 comprising three cells 110, 120, 130. Each cell is being managed by a network node 112, 122, 132, respectively. In the present example, the network nodes 112, 122, 132 are radio base stations. Each radio base station is in communication with one or more wireless communication devices, which are located within the coverage area of the cell being managed by that radio base station. For instance, FIG. 1 shows one wireless communication device 114, located within cell 110, which device is connected to, and in communication with network node, i.e. radio base station 112, as indicated by arrow 116. Two wireless communication devices 124 and 126 are located within cell 120, and both of these devices are in communication with network node, i.e. radio base station 122, as indicated by arrows 128 and 129, respectively. One wireless communication device 134 is located within cell 130, and this device is in communication with network node, i.e. radio base station 132, as indicated by arrow 136. The network nodes, i.e. radio base stations 112, 122, 132 are also connected to one another over a transport network (not shown). This allows the radio base stations to exchange messages with each other, for example to enable intercell interference coordination. For instance, the transport network could use point-to-point microwave connections or fibre optic cables to connect the radio base stations.

It is assumed in this example that each one of the wireless communication devices 114, 124, 126, and 134 is equipped with a single antenna. However, for the sake of completeness it is pointed out that the scenario is equally applicable to wireless communication devices with multiple antennas. To understand why, note that the serving radio base station is aware of the antenna configuration of the wireless device. This information may, for instance, be comprised in the UE capability information in LTE, and may be indicated to the radio base station by the core network when setting up a radio bearer for a specific wireless device. There may also be additional supporting RRC signalling between the wireless device and the RAN for further exchange of capability information. Thus, using this information, the radio base station would know which wireless devices use which transmission rank on each radio bearer. A single wireless device with two antennas may be considered by the serving radio base station as transmitting two data streams. It should be noted that these two streams may be scheduled on either the same, or different radio resources. For the purpose of this disclosure, a single wireless device with two antennas may in practice be treated as equivalent to two wireless devices, each equipped with a single antenna, and located geographically close to each other.

As explained above, transmissions in one cell may cause interference in neighboring cells, especially if the entire frequency spectrum is used for transmissions in all cells, as is typically the case in an LTE system or in an IEEE WiMax system. In the example shown in FIG. 1, the wireless communication device 114 is located close to the border between cells 110 and 120. Therefore, transmissions from the device 114, although directed toward network node, i.e. radio base station 112, will also be received by network node, i.e. base station 122 in neighboring cell 120, and cause interference. This interfering signal is indicated by the dotted arrow 118. It is desirable for network node, i.e. radio base station 122 to take this interference into account when scheduling transmissions for devices 124 and 126. As mentioned above, the network node, i.e. radio base station 112 could indicate the interference level from device 114 by sending a message to network node, i.e. radio base station 122 over the transport network, for instance in the form of a high interference indicator, HII. The HII may also indicate which resource blocks are affected.

The wireless device 134, located on the border between cells 120 and 130, also causes interference to network node, i.e. base station 122, as indicated by dotted arrow 138. Network node, i.e. radio base station 132 may also indicate this by sending a message, e.g. a high interference indicator HII, to network node, i.e. radio base station 122. In the present example, it is assumed that wireless device 134 is scheduled for transmission on the same resource blocks as wireless device 114.

Thus, network node, i.e. radio base station 122 receives two HII messages, indicating interference for the same set of resource blocks. In conventional ICIC methods, if the total level of interference in the time-frequency domain, i.e. the total power level of the interfering signals 118 and 138, is indicated as high, the network node, i.e. radio base station 122 will deduce that it should not schedule any additional transmissions on the resource blocks concerned. Thus, wireless devices 124 and 126 will be scheduled on different resources.

To understand why this behavior may lead to less-than-optimal performance in a MIMO system, we now consider an example where network node, i.e. radio base station 122 is equipped with four antennas for multi-antenna transmission and reception. As explained above, this means that the network node, i.e. radio base station 122 would be able to separate, i.e. successfully receive and decode, at most four spatially multiplexed data streams on each resource block. One such state of the art decoding algorithm that separates spatially multiplexed streams is the successive interference cancellation (SIC). Although network node, i.e. radio base station 122 is interfered by the transmissions 118 and 138 at a high power level, these signals represent only two spatial data streams. Since network node, i.e. radio base station 122 has four receive antennas, it may still be able to successfully decode up to two additional data streams transmitted on the same resource blocks. Therefore, devices 124 and 126 could potentially be scheduled on the same resource blocks as the interfering transmissions 118 and 138. If the network node, i.e. radio base station 122 could detect this possibility, it could thus make scheduling decisions that would take advantage of the available radio resources in a more efficient way.

Consequently, in multicell MIMO systems there is a need for a mechanism that allows the scheduler, which is typically implemented in the base station, to spatially schedule users and to select the number of spatially multiplexed streams such that the multicell interference impacts are taken into account.

According to several embodiments of the present invention, a network node, e.g. a base station, transmits an indication of an amount of spatially multiplexed streams for at least one block of radio resources to at least one receiving network node, e.g. a neighboring base station. This indication allows the receiving network node to take the spatial interference level into account in a scheduling or link adaptation decision, which means that a more efficient utilization of radio resources is made possible. In some embodiments, the indication indicates the number of spatially multiplexed streams for at least one block of radio resources. Such an indication is also referred to as a MIMO stream indicator (SI) in the following disclosure.

In some embodiments of the invention, the problems mentioned above is addressed by using state of the art ICIC algorithms relying on the standardized HII and OI messages, which are sent between base stations, to detect interfering resource blocks. That is, the HII and/or the OI indicators are extended such that the number of spatially multiplexed streams is included in the indicators. This extension of the inter base station messages allows base stations to signal to one another the number of MIMO streams multiplexed on such resource blocks and to request one another to limit the spatially multiplexed streams. Thereby, interference in the spatial domain can be taken into account. A simple rule, which applies to uplink transmissions, is to keep the number of interfering streams to less than the number of receive antennas at the base station. For instance, if the number of receive antennas at the base station is four, then the total number of streams, i.e. the sum of the base station's own streams and the interfering streams, on a particular set of resource blocks should be kept at or below four in order to allow the base station to cancel interference using state of the art receiver algorithms.

A mechanism for improved multicell MIMO interference coordination in a wireless network according to an embodiment of the invention will now be described with reference to FIG. 1a.

Each network node, i.e. BS 112, 122, 132 in the wireless network 100 determines its own interference cancelling capability in terms of the number of the orthogonal spatial streams on each resource block that it can decode with a certain bit error rate probability. This step may involve the Operation & Maintenance (O&M) system of the base station or the network, or other information in the base station or the network.

Alternatively, the network node, i.e. BS 112, 122, 132 may use an adaptive algorithm to adjust this number depending on the measured bit error rate or the measured interference level, etc.

Each network node, i.e. BS 112, 122, 132 uses state of the art mechanisms to determine (1) the set of BS:s to which it should send an OI and an HII indicator. This set of BS:s will be referred to as "neighbors" or "neighboring BS:s" in the following. However, it is to be understood that "neighbor" does not necessarily refer to an actual physical neighbor, i.e. BS:s in adjacent cells. Instead, a "neighbor" in the present context is a BS which is likely to cause interference to the current BS, or a BS to which the current BS is likely to cause interference. Each BS also determines (2) the triggering conditions that dictate when to send the corresponding protocol messages.

Figure 1A:
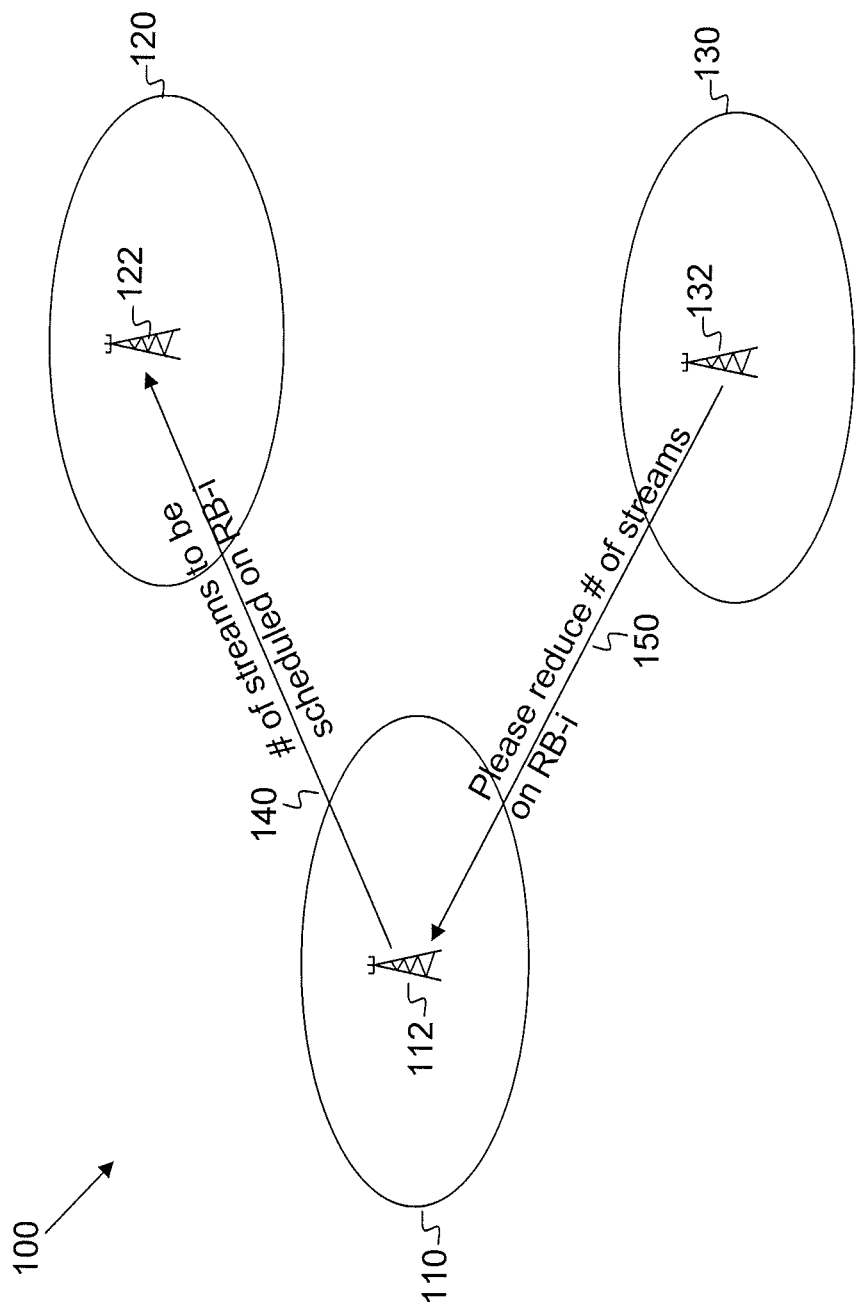
FIG. 1a is a schematic diagram illustrating an embodiment of the present invention.

When a network node, i.e. BS 112, 122, 132 sends an OI or a HII indicator to a neighbor, it includes a MIMO stream indicator (SI) as shown in FIG. 1a. The interpretation of the SI depends on whether the SI is associated with the OI or the HII.

When the SI is associated with the HII, this is referred to as "proactive mode". In this case, the sending BS indicates the number of spatial streams, which may originate from a single user or multiple users, on the resource blocks that are included in the scope of the HII. In FIG. 1a, this is indicated as message 140 transmitted from network node, i.e. BS 112 to network node, i.e. BS 122.

When the SI is associated with the OI, this is referred to as "reactive mode". In a first variant of the reactive mode, the sending BS indicates that the number of spatial streams is high, medium or low. Other levels of granularity are also possible. In a second variant, the sending BS indicates that the number of spatial streams is above a certain, predefined value. In FIG. 1a, an example of a reactive indicator is indicated as message 150, transmitted from network node, i.e. BS 132 to network node, i.e. BS 112.

Since the OI itself is an indicator of high received interference, there are several possible combinations of the OI and the SI. SI could be reported only for the resources indicated by the OI, or it could include all resources, i.e. the full bandwidth. A further alternative is that the SI could include only the resources where there are too many interfering streams, but where the sum of the interference power is not indicated as high.

For both the HII and the OI, the SI can be indicated as one value per resource block or as arbitrarily many values with a predefined mapping to the resource blocks, e.g. an average over all resource blocks accounted for in the report or multiple values, each representing a set of resource blocks.

The interpretation of the SI by the receiving BS also depends on whether the SI is associated with the HII or the OI.

In the proactive mode, the receiving network node, i.e. BS 122 of a HII indicator interprets the SI as a request or recommendation regarding the number of scheduled streams per RB for subsequent scheduling decisions. For example, if the receiving network node, i.e. base station 122 estimates its own interference rejection capability on a certain resource block to three streams and it receives an SI 140 indicating 2 scheduled streams, the receiving network node, i.e. BS 122 initially decides to limit the number of scheduled streams to one. Note that this is non-standardized, proprietary, behavior and a base station is hence free to react as it chooses to the reception of an HII, including the choice of ignoring it.

In the reactive mode, the receiving network node, i.e. BS 112 of an OI indicator interprets the SI as an indication from the sending network node, i.e. BS 132 that the receiving network node, i.e. BS 112 is scheduling, or has been scheduling, too many spatial streams. This is in line with the recommended interpretation of the OI as a reactive indication of too high interference caused by the receiving BS to the sending BS. The receiving network node, i.e. BS 112 should reduce the caused interference by rescheduling users and it should try to reduce the number of streams by, for example, state of the art MIMO mode switching methods.

The sending and receiving BS:s may modify the SI depending on the measured interference level and also on the received OI and HII indicators, per RB or other granularity. For example, in proactive mode, the sending BS may modify the SI such that it indicates more streams than are really scheduled, thereby creating a safety margin for itself. To clarify, if the sending BS indicates one "extra" stream, this means that the receiving BS will have one less stream to schedule, and therefore the sending BS will experience less spatial interference. This behavior by the sending BS may be motivated by a high level of interference due to a variety of different conditions, e.g. high uplink power, the sending BS being located in the neighborhood of many other base stations, etc. Thus, the sending BS tries to improve its SINR by increasing its receive diversity by indirectly requesting the receiving BS to keep the number of scheduled streams low.

Figure 2:
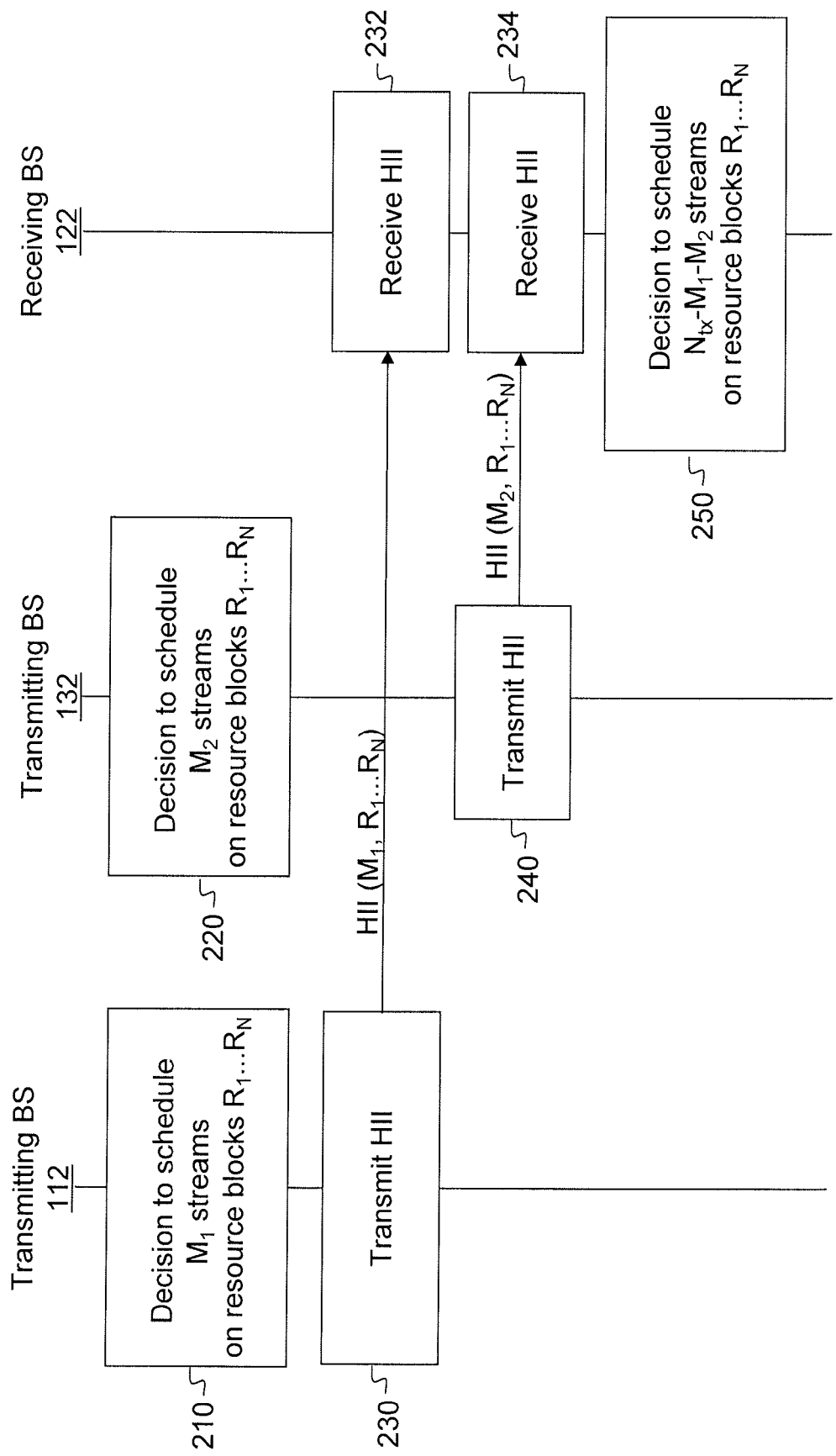
FIG. 2 is a combined signalling scheme and flow chart illustrating a method according to an embodiment of the present invention.

A method for enabling intercell interference coordination according to an embodiment of the invention will now be described with reference to FIG. 1 and FIG. 2. The method is performed in wireless communications network 100 depicted in FIG. 1. This network comprises a network node 112, and a network node 132, both of which comprise at least two antennas for multi-antenna transmission and/or reception. In the present example, network nodes 112 and 132 are both base stations.

As is conventional in many cellular systems, network nodes, i.e. base stations 112 and 132 are responsible for scheduling uplink transmissions for the user equipments that are being served by them. In other words, network node, i.e. base station 112 will schedule transmissions for user equipment 114, and network node, i.e. base station 132 will schedule transmissions for user equipment 134. It is assumed in this example that user equipment 114 and user equipment 134 have both requested resources for uplink transmission, e.g. by sending a scheduling request to their respective base stations.

Network node, i.e. base station 112 responds to the scheduling request from user equipment 114 by making a decision 210 to schedule one data stream, corresponding to the uplink transmission from user equipment 114, on a set of resource blocks $R_1 \ldots R_N$.

At the same or nearly the same time, network node, i.e. base station 132 decides to respond to the scheduling request from user equipment 134 by making a decision 220 to schedule one data stream, corresponding to the uplink transmission from user equipment 134, on a set of resource blocks $R_1 \ldots R_N$. Notably, this happens to be the same set of resource blocks that network node, i.e. base station 112 chose for scheduling user equipment 114.

It should be noted that the details of the scheduling requests and subsequent scheduling steps 210 and 220 are not relevant to the invention. These steps are only described here to put the present method in the proper context. Since scheduling requests and scheduling decisions are well known in the art, the present disclosure will not go into details of how the scheduling decisions are made.

According to the present method, after making the scheduling decision 210, the base station 112 transmits an HII message to at least one receiving network node 122. The HII message comprises the number of spatially multiplexed data streams $M_1$ (in the present example, $M_1=1$) to be scheduled by the network node, i.e. base station 112, and also indicates the set of resource blocks $R_1 \ldots R_N$.

The network node, i.e. base station 132 also transmits an HII message to the receiving network node 122. The HII message comprises the number of spatially multiplexed data streams $M_2$ (in the present example, $M_2=1$) to be scheduled by the network node, i.e. base station 132, and also indicates the set of resource blocks $R_1 \ldots R_N$.

In summary, the network nodes, i.e. base stations 112 and 132 both indicate the level of spatial interference that they expect that the scheduled transmissions will cause, by indicating a number of spatially multiplexed streams in the HII messages.

The receiving network node, i.e. base station 122 comprises four antennas for multi-antenna transmission and/or reception. In steps 232 and 234, network node, i.e. base station 122 receives the HII message from network nodes, i.e. base stations 112 and 132. As mentioned above, the two HII messages comprise information regarding the number of spatially multiplexed streams $M_1$ and $M_2$ that will be scheduled by network nodes, i.e. base stations 112 and 132, respectively. Network node, i.e. base station 122 may now use this information in a scheduling decision and/or a link adaptation decision.

In the present example, network node, i.e. base station 122 will inspect the HII message received in steps 232 and 234, and find that the messages involve the same resource blocks. The network node, i.e. base station 122 concludes that two data streams will be spatially multiplexed on these resource blocks. As mentioned above, the fact that network node, i.e. base station 122 is equipped with four antennas ($N_{rx}=4$) means that it may successfully decode up to four spatially multiplexed streams. Thus, network node, i.e. base station 122 may conclude that up to two more streams may potentially be scheduled on resource blocks $R_1 \ldots R_N$. The network node, i.e. base station 122 consequently makes a decision 250 to schedule $N_{rx}-M_1-M_2=2$ streams on resource blocks $R_1 \ldots R_N$. Referring again to FIG. 1, this means that user equipments 124 and 126, which are served by network node, i.e. base station 122, could also be scheduled on these same resource blocks.

Had the network node, i.e. base station 122 had only three antennas ($N_{rx}=3$), the result would have been that at most one of user equipments 124 and 126 could be scheduled on resource blocks $R_1 \ldots R_N$.

In a variant of this embodiment, the indication of the number of data streams is not comprised in the HII message, but is transmitted separately, either in connection with the HII, or in a different message.

It should further be noted that the number of antennas of any one of the network nodes, i.e. base stations 112, 132 or 122 may vary freely, provided that the number of antennas is at least two, since otherwise MIMO is not possible. The number of antennas will affect the number of streams that each base station may reliably decode, as has been described above.

Furthermore, it is pointed out that the resource blocks scheduled by network node, i.e. base station 112 and network node, i.e. base station 132 may only partially overlap. For instance, network node, i.e. base station 112 indicates one stream to be scheduled on $R_3 \ldots R_{11}$, and network node, i.e. base station 132 indicates one stream on $R_7 \ldots R_{20}$. In this case, receiving network node, i.e. base station 122 will conclude that there are two spatially multiplexed streams on the overlapping set of resource blocks $R_7 \ldots R_{11}$ and one stream on each of the non-overlapping sets of resource blocks $R_3 \ldots R_6$ and $R_{12} \ldots R_{20}$.

Moreover, the configuration of wireless network 100 may vary within the scope of the present example. That is, although FIG. 1 depicts three cells and four user equipments, the wireless network 100 may comprise any number of cells, and each cell may comprise any number of user equipments. It is further pointed out that one base station may manage more than one cell.

Figure 3:
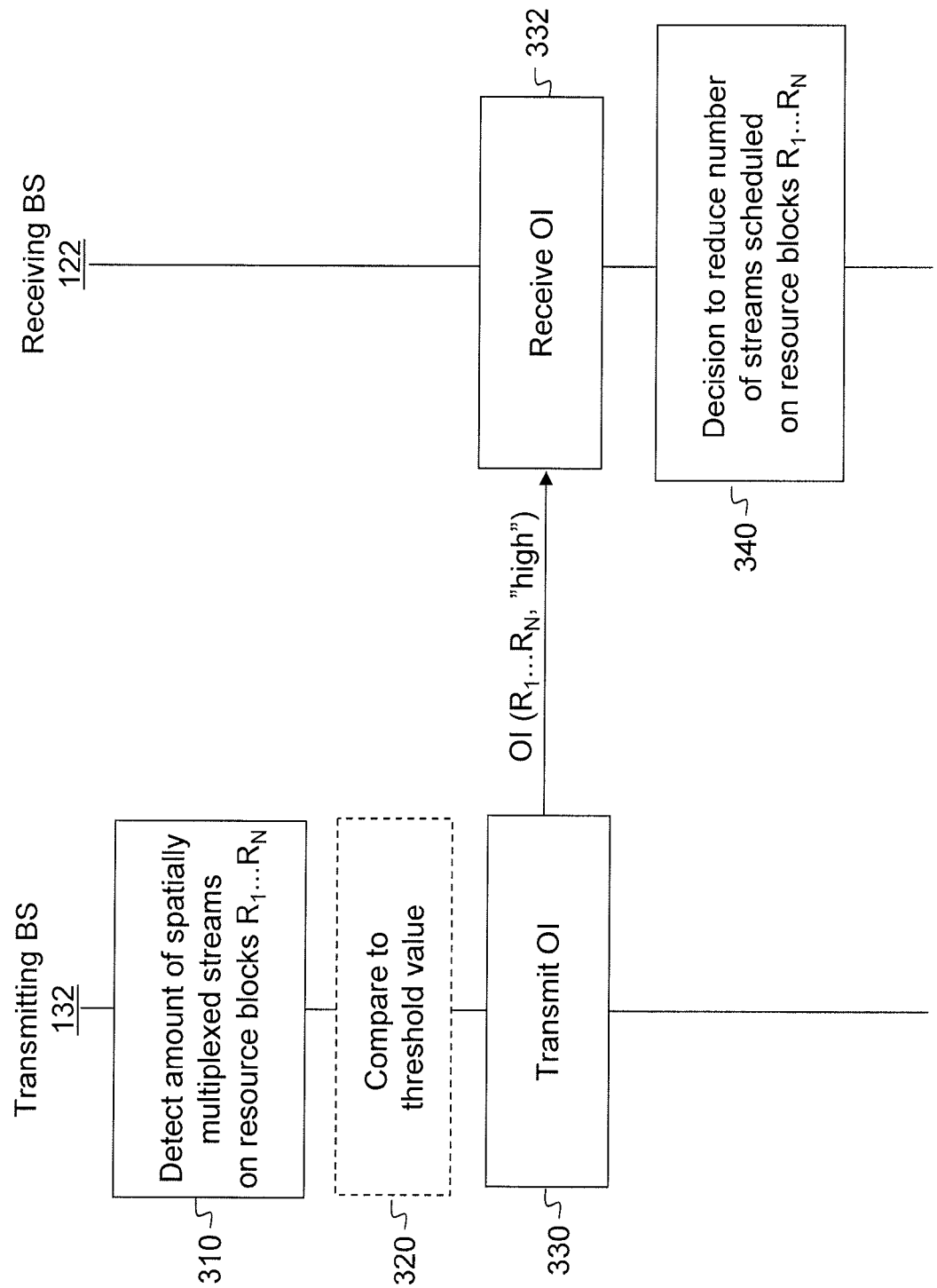
FIG. 3 is a combined signalling scheme and flow chart illustrating a method according to an embodiment of the present invention.

A method for enabling intercell interference coordination according to an embodiment of the invention will now be described with reference to FIG. 1 and FIG. 3. In this embodiment, a reactive approach is used—that is to say, the transmitting network node transmits the indicator in response to experiencing a high level of spatial interference. The method is performed in wireless communications network 100 depicted in FIG. 1. This network comprises a network node 132 and a network node 122. In the present example, both network nodes 132 and 122 are base stations, and both comprise at least two antennas for multi-antenna transmission and/or reception.

In a step 310, the network node, i.e. base station 132 detects a current amount of spatially multiplexed data streams received on at least one block of radio resources. That is, the network node, i.e. base station 132 is experiencing spatial interference, caused by a number of data streams coming from other transmissions within the wireless network 100, which data streams are being spatially multiplexed on the same block of radio resources. In the example scenario shown in FIG. 1, a likely cause of this spatial interference is the transmissions of UE 124 and 126. The number of interfering spatial streams may be estimated by state of the art spatial multiplexing decoding algorithms, such as the well known SIC algorithm.

The network node, i.e. base station 132 then transmits an indication of the current level of spatial interference, i.e. the amount of spatially multiplexed data streams, which was detected in step 310, to neighboring network node, i.e. base station 122.

In a variant of this embodiment, the indication is comprised in an overload indicator (OI). However, the indication may also be sent together with, or in close connection with the OI indicator, rather than being included as part of the OI message. The indication may also be transmitted as a separate message independently of the OI.

In a variant of this embodiment, the network node, i.e. base station 132 compares the detected amount of spatially multiplexed data streams to a predetermined threshold value in step a 320. In another variant, the network node, i.e. base station 132 compares the detected amount of spatially multiplexed data streams to two or more predetermined threshold values, for instance two threshold values corresponding to "low", "medium" and "high" interference. In these variant, the transmitted indication will thus indicate whether the level of spatial interference is "low" or "high", or alternatively "low", "medium" or "high", rather than indicating the exact number of interfering streams.

In some variants, the indication also indicates the set of resource blocks which are affected by the spatial interference. It should be appreciated that the affected set of resource blocks may be indicated in various different ways, for instance by explicitly indicating all affected resource blocks, or by indicating the start and end resource block, or by indicating the start resource block and the number of resource blocks. Furthermore, several indications, concerning different sets of resource blocks may be sent in the same message. For instance, the indicator may comprise the information ["high", 0, 3, "low", 5, 10, "low", 20, 30], which would indicate a high level of spatial interference, i.e. a high number of spatially multiplexed data streams, on resource blocks 0 to 3, and a low level of spatial interference on resource blocks 5 to 10 and 20 to 30.

In other variants, the indication does not indicate which resource blocks are affected by the spatial interference. For example, if the indicator is transmitted as message separate from the OI, the receiving network node may be configured to assume that the spatial interference affects the same resource blocks that are indicated in the OI. Another variant is that the receiving network node is configured to assume that the spatial interference affects the entire bandwidth.

Network node, i.e. base station 122 receives the indication in step 332, and notices that it currently has resources scheduled for UE:s 124 and 126 on the same resource blocks that are referred to by the indicator. In response, network node, i.e. base station 122 makes a decision 340 to reduce the number of streams to be scheduled on the resource blocks concerned. For instance, network node, i.e. base station 122 may decide to move UE 126 to different resources.

As a result, the level of spatial interference experienced by both network nodes, i.e. base stations 132 and 122 will be reduced, since the transmissions of UE 126 in cell 120 will no longer collide with the transmissions of UE 134 in neighboring cell 130. This reduction in intercell interference leads to an overall performance improvement in wireless network 100.

Figure 4:
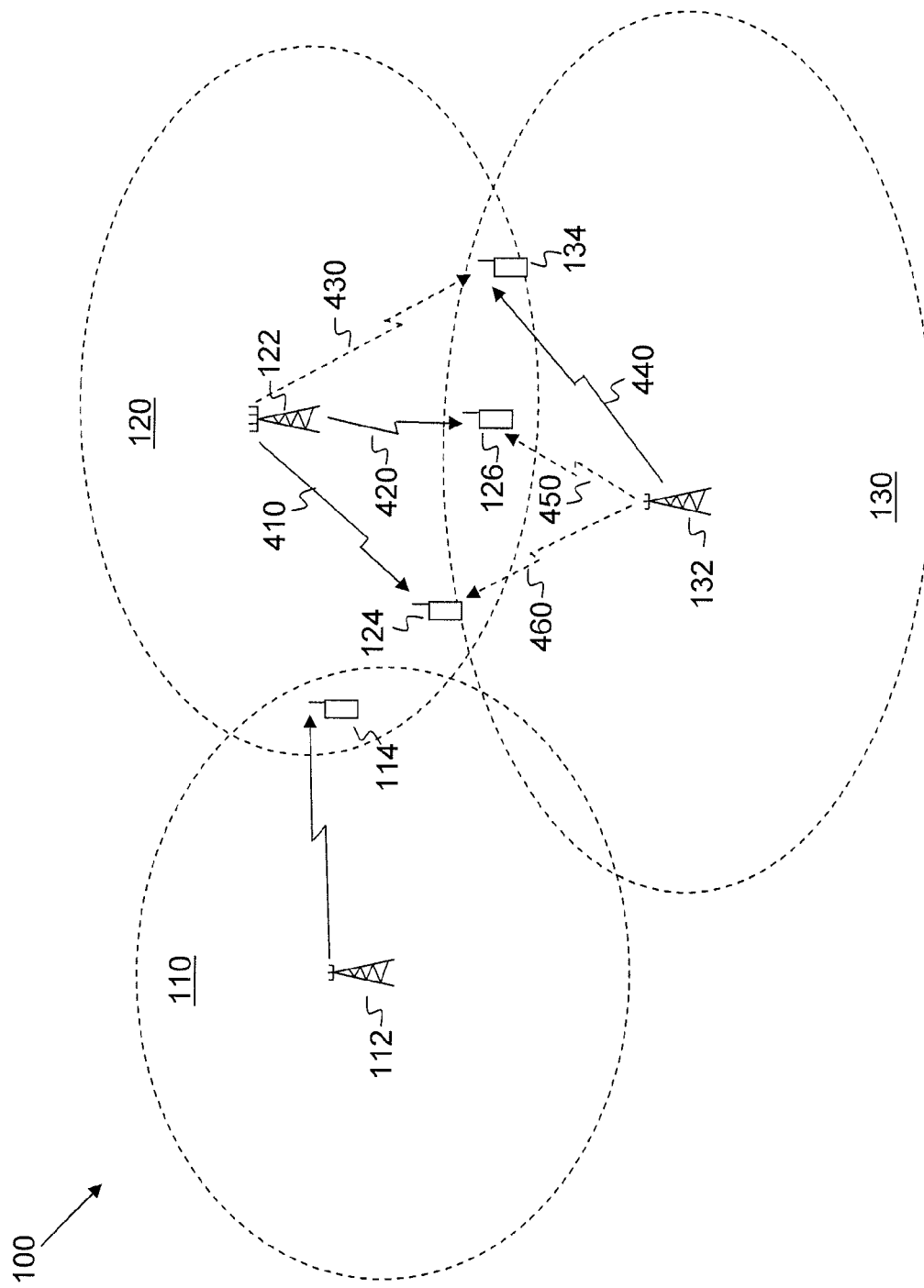
FIG. 4 is a schematic block diagram illustrating a downlink transmission scenario in a radio access network.

In the examples described above, only uplink transmissions have been considered. However, the present invention is also applicable to downlink transmissions. FIG. 4 illustrates the same wireless network 100 as shown in FIG. 1, but for downlink transmissions. In this scenario, it is the network nodes, i.e. base stations 112, 122, and 132 that are transmitting data, and thereby causing interference to nearby user equipments. Network nodes, i.e. base stations 112, 122 and 132 are still making the scheduling decisions, but in this example they are scheduling their own transmissions to the user equipments that they serve. As can be seen in FIG. 4, network node, i.e. base station 122 is performing downlink transmissions directed to UEs 124 and 126, as indicated by arrows 410 and 420. Thus, network node, i.e. base station 122 is transmitting two spatially multiplexed data streams using its multiple antennas. One stream is directed to UE 124, and one stream is directed to UE 126. It should be noted that UEs 124 and 126 must each be equipped with at least two antennas, to be able to separate the spatially multiplexed signals.

UE 134 is located near the border of cell 120, and therefore the signals 410 and 420 are also heard by UE 134. In other words, UE 134 is interfered by network node, i.e. base station 122.

Likewise, the signal 440 transmitted from network node, i.e. base station 132 toward UE 134 is causing interference to UEs 124 and 126, which are located near the border of cell 130.

The downlink case is basically analogous to the uplink case, which has been described in connection with FIGS. 1-3 above. For instance, when network node, i.e. base station 132 decides to schedule the downlink transmission 440, it may indicate this to neighboring base station 122 using a HII message. Similarly, when network node, i.e. base station 122 decides to schedule the downlink transmissions 410 and 420, it may indicate this to network node, i.e. base station 132 using a HII message comprising information that two streams will be indicated on a certain set of resource blocks. The receiving base station may react to this information for instance by reducing the number of scheduled streams, just as described in connection with FIGS. 1-3.

The reactive case works in a similar way, although the indication is triggered in a slightly different way. Since the interference is experienced by UEs 124, 126 and 134, the first step is that a measurement report is sent by one or more of these UEs to the base station to which it is connected. Such measurement procedures, where the UE measures the signal strength of neighboring cells and reports this to its serving base station, are well known in the art.

For instance, UE 134 may send a measurement report to network node, i.e. base station 132, indicating that a strong signal 430 is being received from neighboring cell 120. Network node, i.e. base station 132 may react to this report by transmitting a reactive indicator, e.g. in the form of an OI message, to network node, i.e. base station 122. Network node, i.e. base station 122 may in turn respond by reducing the number of scheduled downlink streams.

Figure 5:
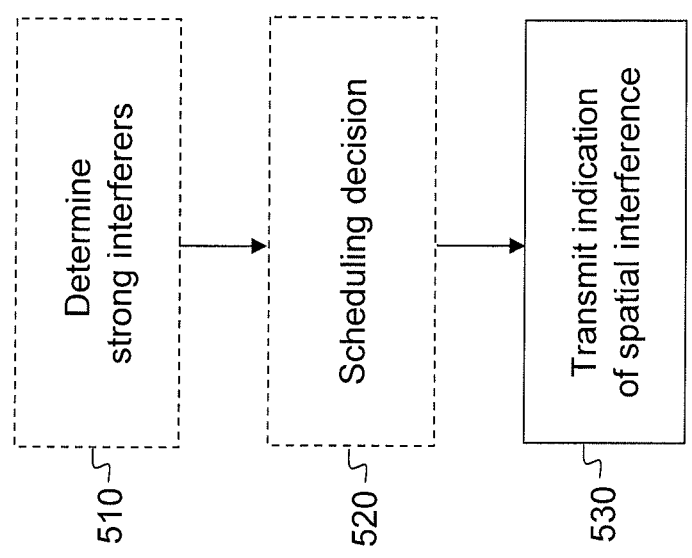
FIG. 5 is a flow chart illustrating a method according to an embodiment of the present invention.

A method in a radio network node 112, 132 for enabling intercell interference coordination according to an embodiment will now be described with reference to FIG. 1 and FIG. 5. The network node 112, 132 comprises at least two antennas for multi-antenna transmission and/or reception. Furthermore, the network node 112, 132 is comprised in a wireless communications network 100.

According to the method, the network node 112, 132 transmits an amount of spatially multiplexed streams for at least one block of radio resources in a step 230, 240. The indication comprises the number of spatially multiplexed data streams to be scheduled by the network node 112, 132 on the at least one block of radio resources. Thus, the indication indicates the amount of spatial interference that the network node 112, 132 expects to cause. The indication is transmitted to at least one receiving network node 122 comprised in the wireless communications network 100.

In a variant of this embodiment, the indication is associated with a high interference indicator HII. The indication could either be included as part of the HII, or transmitted together with the HII. In another variant, the indication is sent in a separate message, independently of the HII.

In another variant of this embodiment, the indication also indicates which of the spatially multiplexed data streams are assigned to the same user.

The network node 112, 132 may be a base station, or a user equipment. To clarify, although in the scenarios described above it has been assumed that the network node transmitting the indication is a radio base station, it is also possible for a user equipment to transmit the indication. As mentioned above, in future systems it is conceivable that a user equipment will make its own scheduling decisions, at least to some extent. In such a system, a user equipment comprising at least two antennas may indicate to its neighbors (e.g. neighboring base stations or other user equipments) how many spatial streams it is intending to schedule.

It is pointed out that the network node 112, 132 may determine to which receiving node or nodes 112, 132 to send the indication using state of the art methods. For instance, the set of strongest interfered or interfering neighbors may be selected as recipients of the indicator. Methods for determining the strongest interferers are well known in the art and will not be described further in this disclosure.

Figure 6:
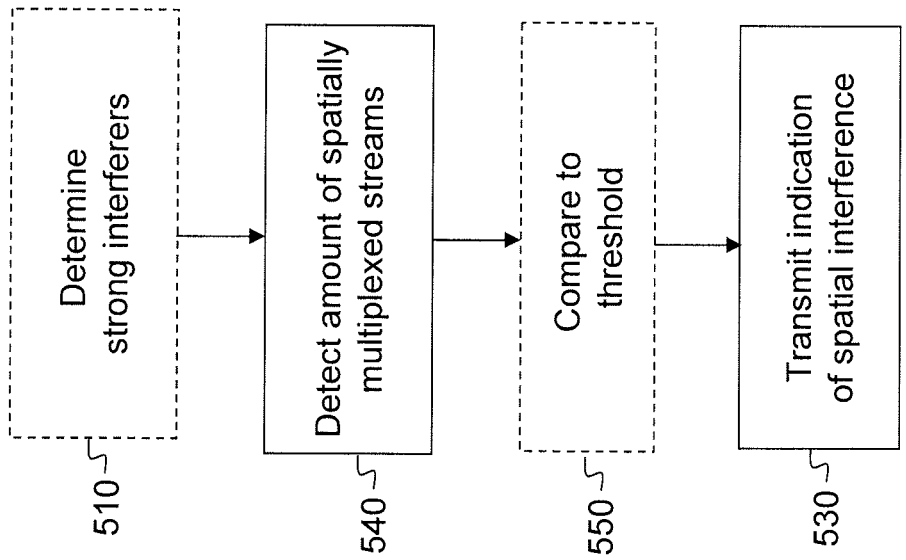
FIG. 6 is a flow chart illustrating a method according to an embodiment of the present invention.

A method in a radio network node 112, 132 for enabling intercell interference coordination according to an embodiment will now be described with reference to FIG. 1 and FIG. 6. The network node 112, 132 comprises at least two antennas for multi-antenna transmission and/or reception. Furthermore, the network node 112, 132 is comprised in a wireless communications network 100.

According to the method, the network node 112, 132 detects a current amount of spatially multiplexed data streams received on at least one block of radio resources in a step 310. That is, the level of spatial interference currently experienced by network node 112, 132 on the at least one block of radio resources is detected.

The network node 112, 132 then transmits an indication of the amount of spatially multiplexed data streams, i.e. an indication of the current level of spatial interference, in a step 330. The indication is transmitted to at least one receiving network node 122 comprised in the wireless communications network 100.

In a variant of this embodiment, the indication comprises the number of spatially multiplexed data streams. Alternatively, the indication could indicate that the amount of spatially multiplexed data streams are above a predetermined threshold, or that the amount of spatially multiplexed data streams are "low", "medium" or "high". Other levels of granularity are also possible.

In another variant, the indication is associated with an overload indicator OI. The indication could either be included as part of the OI, or transmitted together with the OI. In another variant, the indication is sent in a separate message, independently of the OI.

It is pointed out that the network node 112, 132 may determine to which receiving node or nodes 112, 132 to send the indication using state of the art methods. For instance, the set of strongest interfered or interfering neighbors may be selected as recipients of the indicator. Methods for determining the strongest interferers are well known in the art and will not be described further in this disclosure.

The network node 112, 132 may be a base station, or a user equipment. To clarify, although in the scenarios described above it has been assumed that the network node transmitting the indication is a radio base station, it is also possible for a user equipment to transmit the indication. In particular in a downlink scenario, a user equipment may detect a number of interfering spatial data streams, and transmit an indication to its neighbors (e.g. neighboring user equipments, its serving radio base station, or neighboring radio base stations).

A method for scheduling and/or link adaptation in a network node 122 according to an embodiment of the invention will now be described with reference to FIG. 1 and FIG. 7. In the present example, the network node 122 is a base station. The network node, i.e. base station 122 comprises a number N of antennas for multi-antenna transmission and/or reception. The number N is at least equal to two, as otherwise MIMO is not possible. Furthermore, the network node, i.e. base station 122 is comprised in a wireless communications network 100.

According to the method, the network node, i.e. base station 122 determines its own interference rejection capability in step 710. This can be performed using methods known in the art. Based on the interference rejection capability, network node, i.e. base station 122 then determines, in a further step 720, a maximum number of spatially multiplexed data streams $S_{max}$ that the base station expects to be able to decode. Note that, as explained above, $S_{max}$ will be at most equal to the number of receive antennas N, but in some cases it may be less, due to other conditions such as the current channel quality.

In step 730, the network node, i.e. base station 122 receives an indication of an amount of spatially multiplexed data streams on at least one block of radio resources from at least one other network node, 112, 132 in a step 710. The network node 112, 132 is also comprised in the wireless communications network. The indication comprises the number $M_i$ of spatially multiplexed data streams to be scheduled by a neighboring network node i on at least one block of radio resources on the at least one block of radio resources.

It is possible that the network node, i.e. base station 122 receives several such indications, coming from different neighboring network nodes.

It should be noted that steps 730 may alternatively be performed before steps 710 and 720. That is, the base station may first receive an indication of an amount of spatially multiplexed data streams, and subsequently determine its interference rejection capability and $S_{max}$.

The network node, i.e. base station 122 then makes a scheduling decision in step 740, based on the indicator and $S_{max}$. The base station 122 will schedule a number K of spatially multiplexed data streams, such that $$K \leq S_{max} - \sum_{\forall i} M_i,$$

on said at least one block of radio resources. Thus, the network node, i.e. base station 122 takes the intercell spatial interference into account, and adapts its own number of scheduled streams in such a way that it is likely that all signals can be accurately decoded. Since some of the colliding streams will be moved to other resources, the total amount of intercell interference is reduced.

In a variant of this embodiment, the indication is associated with a high interference indicator HII. The indication could either be included as part of the HII, or transmitted together with the HII. In another variant, the indication is sent in a separate message, independently of the HII.

The network node 112, 132 may be a base station, or a user equipment.

A method for scheduling and/or link adaptation in a network node 122 according to an embodiment of the invention will now be described with reference to FIG. 1 and FIG. 7a. In the present example, the network node 122 is a base station. The network node, i.e. base station 122 comprises a number N of antennas for multi-antenna transmission and/or reception. The number N is at least equal to two, as otherwise MIMO is not possible. Furthermore, the network node, i.e. base station 122 is comprised in a wireless communications network 100.

The network node, i.e. base station 122 receives an indication of an amount of spatially multiplexed data streams on at least one block of radio resources from at least one other network node 112, 132 in a step 750. The network node 112, 132 is also comprised in the wireless communications network. However, in this embodiment the indication indicates the amount of spatially multiplexed data streams currently received, i.e. the current level of spatial interference experienced by at least one neighboring network node on the at least one block of radio resources. That is to say, the indication may be interpreted as a request from the neighboring network node to reduce the level of spatial interference of the resource blocks concerned.

The network node, i.e. base station 122 then makes a scheduling decision, in step 760, to reduce the number of data streams scheduled on the at least one block of radio resources, based on the indicator. By reducing the number of streams, the network node, i.e. base station 122 will help reduce the level of intercell interference, which will lead to overall improvement of the system performance. In one variant, the network node, i.e. base station 122 reduces the number of streams by one. It may then wait and see if it receives another indicator, implying that the reduction was not sufficient.

In a variant of this embodiment, the indication is associated with an overload indicator OI. The indication could either be included as part of the OI, or transmitted together with the OI. In another variant, the indication is sent in a separate message, independently of the OI.

In some further embodiments, the methods described in connection with FIGS. 7 and 7a above are implemented in a centralized node, such as a server, instead of in a base station. That is, a server receives one or more spatial interference indicators from one or more base stations. Based on the information gathered from several different base stations, the server may, for instance, make a centralized decision regarding the number of streams to be scheduled by each base station on a certain set of resource blocks. The number of streams to be scheduled may then be distributed among the base stations in such a way as to minimize the intercell interference as much as possible. The server also forwards the information to each base station concerned.

In the current LTE standard, the scheduling decision for both downlink and uplink is taken in the base station, where the spatial interference indicators described in the above embodiments are available. Decisions could however also, in the future of LTE or in other systems, be taken to some degree in the user equipment. In this case the indicators would need to be conveyed, in their original format or in another format, to the device making the decision, i.e. the user equipment.

Consequently, in some embodiments of the present invention, the network node that receives the indicator is a user equipment. One such embodiment will now be described, again with reference to FIGS. 1 and 7a, as the main method steps are the same.

The method is performed in a user equipment 124, which is comprised in a wireless communications network 100. The user equipment 124 is equipped with N antennas for multi-antenna transmission and/or reception. Furthermore, the user equipment 124 is connected to a network node 122, which in the present example is a base station.

In a first step 750, the user equipment receives an indicator from network node, i.e. base station 122, to which it is connected. In this embodiment, the indicator indicates a number M of spatially multiplexed data streams available for scheduling by the user equipment on at least one block of radio resources. Thus, it is assumed that the network node, i.e. base station 122 has already received a spatial interference indicator at its end, and used this to determine how many spatial data streams are available for scheduling in the cell 120. Network node, i.e. base station 122 then decides how to distribute the available streams to its served UEs 124 and 126. For instance, it may indicate that the UEs may use one stream each, or that UE 124 may use two streams and UE 126 zero streams on the resource blocks concerned.

The user equipment 124 then uses the indication in a scheduling decision in step 760, such that the user equipment schedules at most K data streams, where K≤M and K≤N, on the at least one block of radio resources.

With respect to all the embodiments described in connection with FIGS. 7 and 7a above, it is pointed out that there are various possible ways in which the receiver may react to the indicator. In an actual system comprising several base stations, a possible scenario is that two neighboring base station may both experience a high level of interference from the other base station. This may cause both base stations to send a reactive indicator to each other simultaneously, or nearly simultaneously. However, if both base stations respond by reducing the level of spatial interference, this may lead to a non-optimal result, since it is possible that the resources in the spatial domain will then be underused. This problem may be resolved in several ways. One option is that the receiver may ignore the message with a certain probability, for instance half of the time. Another option is that one base station among a set of base stations is designated as "master", and given the role of deciding which indicator gets precedence. Alternatively, the receiver may use a measurement, such as current load, to determine how to react to the indicator. For instance, a highly loaded base station may decide to ignore a request to reduce interference.

Figure 8:
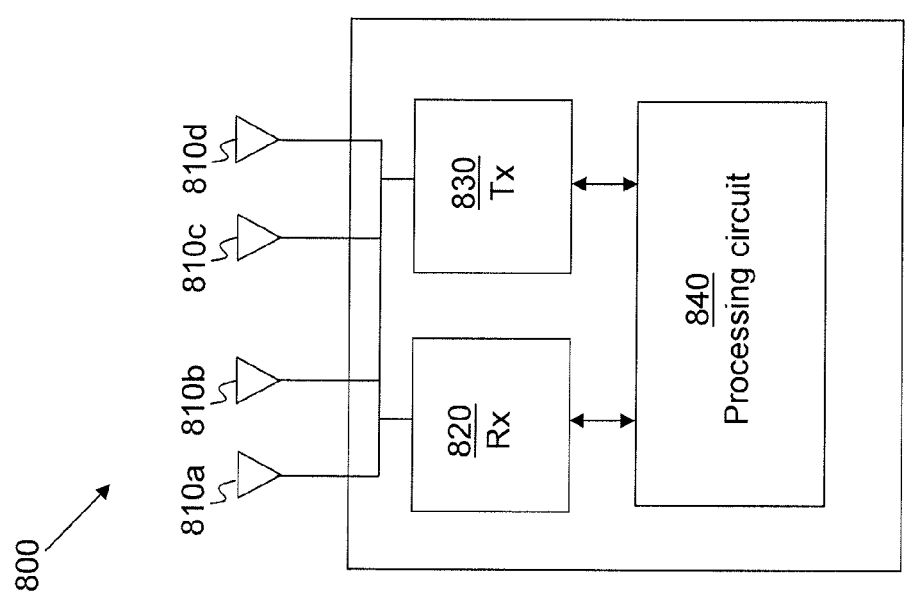
FIG. 8 is a schematic block diagram illustrating a network node according to an embodiment of the present invention.

FIG. 8 is a block diagram illustrating a network node 800 configured to implement the methods described in connection with FIGS. 5 and 6 above. The network node 800 is adapted for use in a wireless communications network 100, and comprises at least four antennas 810a, 810b, 810c, 810d for multi-antenna transmission and/or reception. It should be noted that in alternative embodiments, the network node 800 may include any number of antennas, as long as the number of antennas is at least equal to two. The network node 800 further comprises a transmitting unit 830, a receiving unit 820, and one or more processing circuits 840. The one or more processing circuits 840 are configured to transmit an indication of an amount of spatially multiplexed data streams on at least one block of radio resources to at least one receiving network node 122 comprised in the wireless communications network 100. The indication is transmitted via the transmitting unit 830.

In some embodiments, the indication comprises at least the number of spatially multiplexed data streams to be scheduled by the network node 800 on at least one block of radio resources, thereby indicating a level of spatial interference that the network node (800) expects to cause.

In some embodiments, the one or more processing circuits 840 are further configured to transmit the indication in association with a high interference indicator HII.

In some embodiments, the network node 800 further comprising a receiving unit 820. In these embodiments, the at least one processing circuit 840 is further configured to detect a current amount of spatially multiplexed data streams on at least one block of radio resources, received by said network node 800 via the receiving unit 820. Furthermore, the indication indicates said current amount of spatially multiplexed data streams.

In some embodiments, the at least one processing circuit 840 is further configured to transmit the indication when said current amount of spatially multiplexed data streams is above a threshold.

In some embodiments, the at least one processing circuit 840 is further configured to associate said indication with an overload indicator OI.

In some embodiments, the at least one processing circuit 840 is further configured to transmit said indication to at least one neighboring network node 122.

In some embodiments, the at least one processing circuit 840 is further configured to determine a set of most interfered neighboring network nodes, and to transmit the indication to one or more of the nodes comprised in this set of most interfered neighboring network nodes.

In all the embodiments described in connection with FIG. 8, the network node 800 may be a base station or a user equipment.

Figure 9:
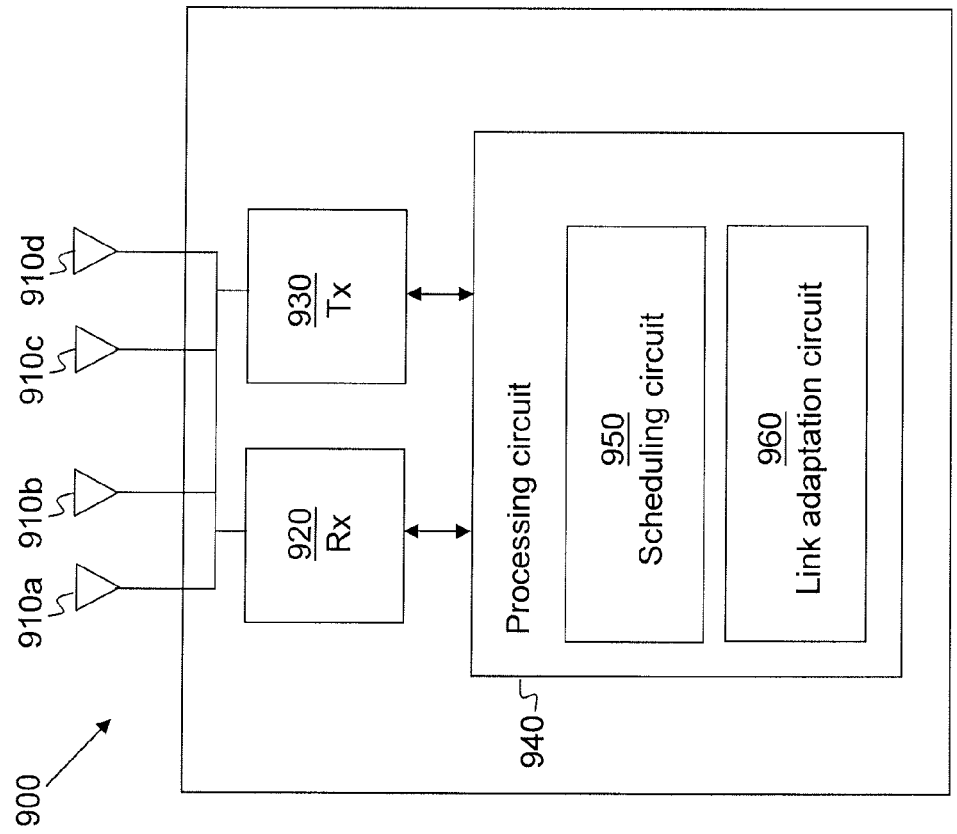
FIG. 9 is a schematic block diagram illustrating a network node according to an embodiment of the present invention.

FIG. 9 is a block diagram illustrating a network node 900 for use in a wireless communications network 100. The network node 900 is configured to implement the methods described in connection with FIGS. 7 and 7a above. The network node 900 comprising four antennas 910a, 910b, 910c, 910d for multi-antenna transmission and/or reception. However, in general, the network node 900 may comprise any number N of antennas, the number N being at least two. Furthermore, the network node 900 comprises at least one processing circuit 940, a transmitting unit 930 and a receiving unit 920. The processing circuit 940 further comprises a scheduling circuit 950, and a link adaptation circuit 960. The processing circuit 940 is configured to receive an indication of an amount of spatially multiplexed data streams on at least one block of radio resources from at least one other network node 112, 132. The indication is received via the receiving unit 920.

The processing circuit 940 is further configured to use the indication in a scheduling decision in said scheduling circuit 950, and/or in a link adaptation decision in the link adaptation circuit 960.

In some embodiments, the processing circuit 940 is further adapted to use said indication by reducing the number of data streams scheduled on said at least one block of radio resources.

In some embodiments, the indication indicates the number of spatially multiplexed streams for the at least one block of radio resources. The indication may be associated with a high interference indicator HII.

In some embodiments, the indication indicates a number $M_i$ of spatially multiplexed data streams to be scheduled by at least one neighboring network node i on at least one block of radio resources.

In some embodiments, the processing circuit 940 is further adapted to use said indication in a scheduling decision in the scheduling circuit 950 by scheduling a number K of spatially multiplexed data streams, such that $$K \le N - \sum_{\forall i} M_i,$$

on said at least one block of radio resources.

In some embodiments, the processing circuit 940 is further adapted to determine an interference rejection capability of said network node, and to determine, based on said interference rejection capability, a maximum number of spatially multiplexed data streams $S_{max}$ that the network node 900 expects to be able to decode. Furthermore, the scheduling circuit 950 is configured to schedule a number K of spatially multiplexed data streams, such that $K \le S_{max}$, on said at least one block of radio resources.

In some embodiments, the indication indicates a number M of spatially multiplexed data streams available for scheduling on at least one block of radio resources, and the scheduling circuit 950 is configured to schedule at most K data streams, where $K \le M$ and $K \le N$, on said at least one block of radio resources.

In some embodiments, the indication indicates the current amount of spatially multiplexed data streams received by at least one neighboring network node on said at least one block of radio resources. In some further embodiments, the indication is associated with an overload indicator OI.

In all of the embodiments described in connection with FIG. 9, the network node 900 may be a base station or a user equipment.

In general, those skilled in the art will appreciate that processing circuits 840, 940 may comprise any of a variety of physical configurations, such as in the form of one or more application-specific integrated circuits (ASICs). In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be construed as limiting the scope of the invention, which is defined by the appending claims. In particular, it will be clear to the skilled in the art that the indicators can apply with arbitrary but defined granularity in the time domain and for an arbitrary but defined period, and with an arbitrary but defined granularity in the frequency domain. Furthermore, the indicators could be of arbitrary granularity in both domains, i.e. they could apply to a single resource block, a set of resource blocks, or to the whole bandwidth. Also, the indicators may apply to one cell or to a set of cells.

The invention claimed is:

1. A method in a network node of enabling inter-cell interference coordination, the network node including at least two antennas for multi-antenna transmission and/or reception and being included in a wireless communication network, the method comprising:
   detecting, by the network node, a current amount of spatially multiplexed data streams received on at least one block of radio resources;
   comparing the detected amount of spatially multiplexed data streams to at least two thresholds;
   transmitting, to at least one receiving network node in the wireless communication network and based on the comparing, an indication of an amount of spatially multiplexed data streams for at least one block of radio resources, the indication being for enabling inter-cell interference coordination based on the indication and for indicating which resource blocks the interference affects, wherein the indication comprises at least the number of spatially multiplexed data streams to be scheduled by the network node on at least one block of radio resources, thereby indicating a level of spatial interference that the network node expects to cause.

2. The method of claim 1, wherein the indication is associated with a high interference indicator.

3. The method of claim 1, further comprising detecting a current amount of spatially multiplexed data streams received by the network node on at least one block of radio resources, wherein the indication indicates the amount of spatially multiplexed data streams.

4. The method of claim 3, wherein the indication is transmitted when the amount of spatially multiplexed data streams is above a threshold.

5. The method of claim 4, wherein the indication is associated with an overload indicator.

6. The method of claim 1, wherein the indication is transmitted to at least one neighboring network node.

7. The method of claim 1, further comprising determining a set of most interfered neighboring network nodes, wherein the indication is transmitted to one or more of the nodes in the set.

8. A method of scheduling and/or link adaptation in a network node having a number N of antennas for multi-antenna transmission and/or reception in a communication network, wherein N≥2, the method comprising:
   receiving, from at least one other network node in the communication network, an indication of an amount of spatially multiplexed data streams for at least one block of radio resources, the indication being for enabling inter-cell interference coordination based on the indication;
   using the indication in at least one of a scheduling decision and a link adaptation decision;
   wherein the indication indicates the number of spatially multiplexed streams for the at least one block of radio resources, thereby indicating a level of spatial interference that the at least one other network node expects to cause;
   wherein the indication indicates a number $M_i$ of spatially multiplexed data streams to be scheduled by at least one neighboring network node i on at least one block of radio resources;
   wherein using the indication in a scheduling decision comprises scheduling a number K of spatially multiplexed data streams, such that $$K \le N - \sum_{\forall i} M_i,$$

block of radio resources;
   determining an interference rejection capability of the network node; and
   determining, based on the interference rejection capability, a maximum number of spatially multiplexed data streams $S_{max}$ that the network node expects to be able to decode;
   wherein the scheduling decision comprises scheduling a number K of spatially multiplexed data streams, such that $K \le S_{max}$, on the at least one block of radio resources.

9. The method of claim 8, wherein using the indication comprises reducing a number of data streams scheduled on the at least one block of radio resources.

10. The method of claim 8, wherein the indication is associated with a high interference indicator.

11. The method of claim 8, wherein the indication indicates a number M of spatially multiplexed data streams available for scheduling on at least one block of radio resources, and using the indication comprises scheduling at most a number K of data streams, where K≤M and K≤N, on the at least one block of radio resources.

12. The method of claim 8, wherein the indication indicates the current amount of spatially multiplexed data streams received by at least one neighboring network node on the at least one block of radio resources.

13. The method of claim 12, wherein the indication is associated with an overload indicator.

14. A network node for enabling inter-cell interference coordination, the network node being adapted for use in a wireless communication network, the network node comprising:
   detecting, by the network node, a current amount of spatially multiplexed data streams received on at least one block of radio resources;
   comparing the detected amount of spatially multiplexed data streams to at least two thresholds;
   at least two antennas for multi-antenna transmission and/or reception;
   a transmitter; and
   at least one processing circuit, wherein the at least one processing circuit is configured to transmit, via the transmitter, to at least one receiving network node in the wireless communication network and based on the comparing, an indication of an amount of spatially multiplexed data streams on at least one block of radio resources, the indication being for enabling inter-cell interference coordination based on the indication and for indicating which resource blocks the interference affects, wherein the indication comprises at least the number of spatially multiplexed data streams to be scheduled by the network node on at least one block of radio resources, thereby indicating a level of spatial interference that the network node expects to cause.

15. The network node of claim 14, wherein the at least one processing circuit is configured to transmit the indication in association with a high interference indicator.

16. The network node of claim 14, further comprising a receiver, wherein the at least one processing circuit is further configured to detect a current amount of spatially multiplexed data streams on at least one block of radio resources, received by the network node via the receiver; and the indication indicates the current amount of spatially multiplexed data streams.

17. The network node of claim 16, wherein the at least one processing circuit is further configured to transmit the indication when the current amount of spatially multiplexed data streams is above a threshold.

18. The network node of claim 16, wherein the at least one processing circuit is further configured to associate the indication with an overload indicator.

19. The network node of claim 14, wherein the at least one processing circuit is further configured to transmit the indication to at least one neighboring network node.

20. The network node of claim 14, wherein the at least one processing circuit is further configured determine a set of most interfered neighboring network nodes, and to transmit the indication to at least one neighboring network node in the set.

21. The network node of claim 14, wherein the network node is a base station.

22. The network node of claim 14, wherein the network node is a user equipment.

23. A network node for a wireless communication network, the network node comprising:
a number N of antennas for multi-antenna transmission and/or reception, wherein $N \geq 2$;
a transmitter;
a receiver; and
at least one processing circuit configured to receive, via the receiver, from at least one other network node in the wireless communication network, an indication of an amount of spatially multiplexed streams for at least one block of radio resources, the indication being for enabling inter-cell interference coordination based on the indication; wherein the at least one processing circuit comprises a scheduling circuit and a link adaptation circuit; and the at least one processing circuit is further configured to use the indication in at least one of a scheduling decision in the scheduling circuit and a link adaptation decision in the link adaptation circuit;
wherein the indication indicates the number of spatially multiplexed streams for the at least one block of radio resources, thereby indicating a level of spatial interference that the at least one other network node expects to cause;
wherein the indication indicates a number $M_i$ of spatially multiplexed data streams to be scheduled by at least one neighboring network node i on at least one block of radio resources;
wherein the at least one processing circuit is further configured to determine an interference rejection capability of the network node, and to determine, based on the interference rejection capability, a maximum number of spatially multiplexed data streams Smax that the network node expects to be able to decode; and the scheduling circuit is configured to schedule a number K of spatially multiplexed data streams, such that $K \leq S_{max}$, on the at least one block of radio resources.

24. The network node of claim 23, wherein the at least one processing circuit is further configured to use the indication by reducing a number of data streams scheduled on the at least one block of radio resources.

25. The network node of claim 23, wherein the at least one processing circuit is further configured to use the indication in a scheduling decision in the scheduling circuit by scheduling a number K of spatially multiplexed data streams such that $$K \leq N - \sum_{\forall i} M_i,$$

on the at least one block of radio resources.

26. The network node of claim 23, wherein the indication is associated with a high interference indicator.

27. The network node of claim 23, wherein the indication indicates a number M of spatially multiplexed data streams available for scheduling on at least one block of radio resources, and the scheduling circuit is configured to schedule at most a number K of data streams, where $K \leq M$ and $K \leq N$, on the at least one block of radio resources.

28. The network node of claim 24, wherein the indication indicates a current amount of spatially multiplexed data streams received by at least one neighboring network node on the at least one block of radio resources.

29. The network node of claim 25, wherein the indication is associated with an overload indicator.

30. The network node of claim 23, wherein the network node is a base station.

31. The network node of claim 23, wherein the network node is a user equipment.

* * * * *

UNITED STATES PATENT AND TRADEMARK OFFICE
CERTIFICATE OF CORRECTION

| | | |
|---|---|---|
| PATENT NO. | : 9,065,501 B2 | Page 1 of 1 |
| APPLICATION NO. | : 13/011905 | |
| DATED | : June 23, 2015 | |
| INVENTOR(S) | : Fodor et al. | |

It is certified that error appears in the above-identified patent and that said Letters Patent is hereby corrected as shown below:

In the specification

In Column 15, Line 6, delete "steps" and insert -- step --, therefor.

In the claims

In Column 21, Line 34, in Claim 20, delete "configured determine" and insert -- configured to determine --, therefor.

Signed and Sealed this
Twenty-sixth Day of January, 2016

Michelle K. Lee
*Director of the United States Patent and Trademark Office*